Nov. 13, 1956                E. G. DANNER                2,770,478
PISTON ROD AND CRANK PIN CONNECTION FOR AQUARIUM PUMPS
Filed Nov. 12, 1952
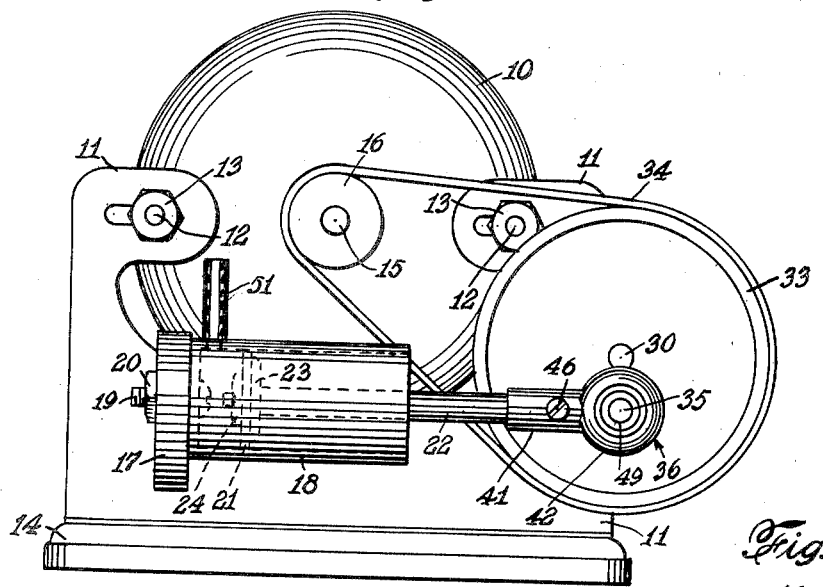
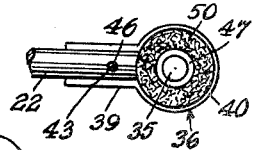
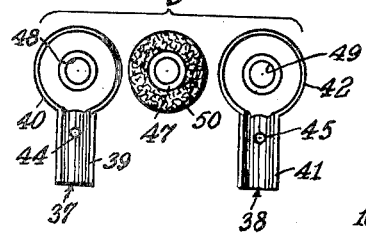
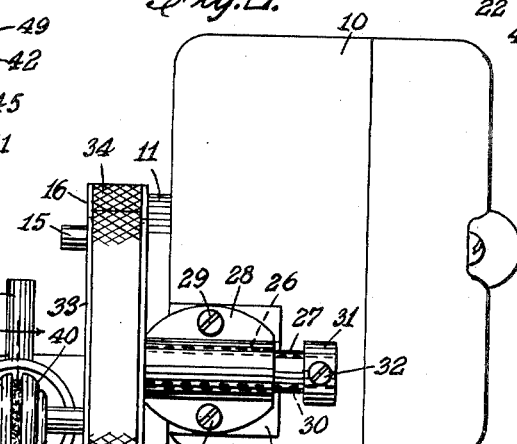
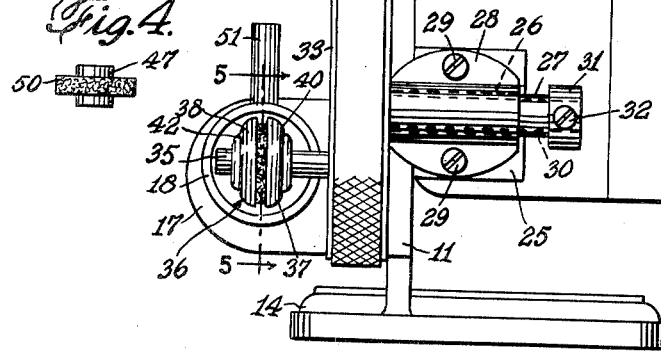
INVENTOR.
EUGENE G. DANNER
BY
ATTORNEY

United States Patent Office 2,770,478
Patented Nov. 13, 1956

2,770,478

PISTON ROD AND CRANK PIN CONNECTION FOR AQUARIUM PUMPS

Eugene G. Danner, Brooklyn, N. Y.

Application November 12, 1952, Serial No. 319,816

1 Claim. (Cl. 287—96)

This invention relates to an interchangeable bushing for aquarium pumps.

It is an object of the present invention to provide an interchangeable bushing for aquarium pumps which may be readily removed or attached to the crank pin and piston rod of the pump with a minimum of effort and without requiring any mechanical skill.

It is another object of the present invention to provide an interchangeable bushing for aquarium pumps in which all the parts could be replaced by a layman without sending to the factory.

Other objects of the present invention are to provide an interchangeable bushing for aquarium pumps bearing the above objects in mind which is of simple construction, inexpensive to manufacture, has a minimum number of parts, is compact, durable, easy to install and remove, and efficient in operation.

For other objects and for a better understanding of the invention, reference may be had to the following detailed description taken in connection with the accompanying drawing, in which:

Fig. 1 is a front elevational view of a bushing embodying the features of the present invention and shown in operative use upon an aquarium pump;

Fig. 2 is an end elevational view thereof;

Fig. 3 is an exploded top plan view of the parts comprising the bushing;

Fig. 4 is an end elevational view of one of the parts shown in Fig. 3, and

Fig. 5 is a vertical sectional view taken along line 5—5 of Fig. 2.

Referring more in detail to the drawing, in which similar reference characters designate corresponding parts throughout the several views, there is shown a fractional horsepower electric motor 10 secured at each side of its front face to an upstanding bracket 11 by means of screws 12 and nuts 13, substantially as illustrated in Fig. 1, the bracket 11 being secured along its lower edge in suitable manner to a heavy base 14.

The motor 10 is provided with the usual drive shaft 15 on which is fixedly mounted a pulley 16 for a purpose to be hereinafter referred to.

A bracket 17 is rigidly secured to the front face of the bracket 11 by suitable means and extends outwardly therefrom at right angles to fixedly mount a horizontal cylinder 18, one end of the cylinder 18 being secured to the bracket 17 by means of a screw 19 and a nut 20.

A piston 21 adapted for reciprocating motion within the cylinder 18 is secured to a piston rod 22 by means of a metal washer 23 and a nut 24 screwed onto the threaded end of the piston rod, substantially as illustrated in Fig. 1.

Referring now particularly to Fig. 2, it will be seen that a bearing member 25 is secured in suitable manner to the rear face of bracket 11 at one side of the motor 10, this bearing member being provided with a semi-cylindrical opening 26 in which a cylindrical sleeve 27 is secured by means of a bracket 28 and screws 29. A shaft 30 is rotatably mounted within sleeve 27, being provided at its rear end with a ring 31 secured thereto by a set screw 32 whereby to prevent longitudinal displacement of the shaft forwardly through the sleeve 27.

The other end of shaft 30 extends outwardly from the front of sleeve 27 and fixedly carries a large pulley 33.

As shown in Fig. 1, a friction belt 34 connects the pulley 33 with the pulley 16, transmitting angular rotation of drive shaft 15 during operation of motor 10 to the pulley 33.

An eccentric crank pin 35 is fixedly secured to the front face of pulley 33 extending outwardly therefrom past the end of piston rod 22 at right angles to the latter.

The angular rotation of the crank pin 35 is transformed into linear reciprocating motion of the piston rod 22 by means of a bushing, referred to collectively as 36, interconnecting the two in a manner to be described directly.

It will be seen that the bushing 36 consists of a housing having a cylindrical portion adapted to receive the piston rod 22 therewithin and a circular portion adapted to receive the crank shaft 35 transversely therethrough in a rotatable manner.

The housing is stamped of metal in two separable halves 37 and 38, identical in shape but in use of opposite complementary form with the end portions thereof concavely curved.

The half 37 is made up of a semi-cylindrical portion 39 and a circular portion 40, while the half 38 is made up of a semi-cylindrical portion 41 and a circular portion 42, substantially as illustrated in Fig. 3.

The piston rod 22 at its end remote from the piston 21 is provided with a transverse threaded opening 43 within the cylindrical portion of the assembled bushing 36, as shown in Fig. 5. The portions 39 and 41 are provided with threaded openings 44 and 45 in alignment with the opening 43, a screw 46 being screwed into the aligned openings 43, 44 and 45 whereby to secure the halves 37 and 38 together and the end of the piston rod 22 within the cylindrical portion of the bushing 36.

A small cylindrical sleeve 47 (see Fig. 4) is housed within the circular portion of the bushing 36 between the circular halves 40 and 42, these latter halves being provided with openings 48 and 49 aligned with the hollow interior of the sleeve 47. The sleeve 47 is surrounded by a ring 50 of lubricating packing material adapted to fit snugly within the convexly curved central portions of the bushing 36.

The crank pin 35, as shown in Fig. 5, is rotatably housed within the sleeve 47, passing through the openings 48 and 49 in the bushing.

Thus it will be seen that angular motion of crank pin 35 is transmitted linearly to bushing 36 which in turn activates the piston rod 22 in a reciprocating manner within cylinder 18.

A vertically extending outlet 51 is secured to the top of cylinder 18 and communicating with the interior thereof transmits the compression within the cylinder to a line, not shown, connected with the aquarium.

To remove the bushing 36 and to replace any of the parts thereof, it is only necessary to unscrew the screw 46 by means of a screw-driver, whereupon the half 38 will slide off the crank shaft. The sleeve 47 and packing 50 may then be slid off the crank shaft, followed by the removal of the half 37 in a similar manner. To install the bushing, the reverse of the above operations are followed.

It should now be apparent that there has been provided an interchangeable bushing for aquarium pumps which may be readily removed or attached to the crank pin and piston rod of the pump with a minimum of effort and without requiring any mechanical skill. It should also be apparent that there has been provided a bushing of the above type in which all of the parts thereof may be replaced by a layman without sending to the factory.

Especially is it now obvious that the bushing embodying my invention facilitates attachment and removal thereof without dismantling the pump as a whole, and hence, an important object of convenience and simplicity of replacement and installation of the bushing is accomplished thereby.

While various changes may be made in the detailed construction, it shall be understood that such changes shall be within the spirit and scope of the invention as defined by the appended claim.

I claim:

A connector for a piston rod and crank pin of the character described, including a pair of opposed separable symmetrical halves, each half having a substantially semi-cylindrical portion of maximum diameter and a convexly curved or bulging central portion, the semi-cylindrical portion in each case having a peripheral wall, said separable halves each having the central convexly curved portion thereof provided with a central convex portion having a central hole for a crank pin, said central convex portions with their central holes being alined to receive the crank pin simultaneously through both central holes, the semi-cylindrical portions of both halves being adapted to receive the piston rod therebetween, unitary means for securing said halves together along said semi-cylindrical portions and for securing the piston rod therewithin, a cylindrical sleeve intermediate said central convexly curved portions disposed within said convex portions, and a substantially flat circular body of lubricant-containing packing material disposed intermediate said convex portions and having a central opening receiving said sleeve therethrough, and said crank pin being adapted to be rotatably received through the alined central holes in said convex portions and through the sleeve therebetween.

References Cited in the file of this patent
UNITED STATES PATENTS

| | | |
|---|---|---|
| 103,196 | Kealy | May 17, 1870 |
| 109,047 | Perkins | Nov. 5, 1870 |
| 182,983 | Wright | Oct. 3, 1876 |
| 274,187 | Goubert | Mar. 20, 1883 |
| 1,310,638 | Summers | July 22, 1919 |
| 1,677,937 | Thordarson | July 24, 1928 |
| 2,100,965 | Kuskie | Nov. 30, 1937 |
| 2,230,472 | Sullivan | Feb. 4, 1941 |